United States Patent
Chavan et al.

(10) Patent No.: US 10,838,961 B2
(45) Date of Patent: Nov. 17, 2020

(54) PREFIX COMPRESSION

(71) Applicant: Oracle International Corporation, Redwood Shores, CA (US)

(72) Inventors: Shasank K. Chavan, Menlo Park, CA (US); Xia Hua, Mountain View, CA (US); Lawrence C. Jenkins, Redwood Shores, CA (US); Sangho Lee, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 101 days.

(21) Appl. No.: 16/022,377

(22) Filed: Jun. 28, 2018

(65) Prior Publication Data
US 2019/0102429 A1    Apr. 4, 2019

Related U.S. Application Data

(60) Provisional application No. 62/565,502, filed on Sep. 29, 2017.

(51) Int. Cl.
| | | |
|---|---|---|
| *G06F 16/2453* | (2019.01) | |
| *G06F 9/38* | (2018.01) | |
| *G06F 16/22* | (2019.01) | |
| *G06F 16/23* | (2019.01) | |

(52) U.S. Cl.
CPC ...... *G06F 16/24549* (2019.01); *G06F 9/3887* (2013.01); *G06F 16/221* (2019.01); *G06F 16/2365* (2019.01)

(58) Field of Classification Search
CPC ............ G06F 16/24549; G06F 16/221; G06F 16/2365; G06F 9/3887
See application file for complete search history.

(56) References Cited

U.S. PATENT DOCUMENTS

| | | |
|---|---|---|
| 6,353,826 B1 | 3/2002 | Seputis |
| 6,366,901 B1 | 4/2002 | Ellis |
| 6,615,206 B1 | 9/2003 | Jakobsson et al. |
| 6,732,085 B1 | 5/2004 | Mozes |

(Continued)

OTHER PUBLICATIONS

Shergill Jr. , U.S. Appl. No. 15/267,759, filed Sep. 16, 2016, Office Action, dated Oct. 10, 2018.

(Continued)

*Primary Examiner* — Jay A Morrison
(74) *Attorney, Agent, or Firm* — Marcel K. Bingham; Hickman Palermo Becker Bingham LLP

(57) ABSTRACT

Techniques related to prefix compression are disclosed. Each value in a set of values has a prefix component and a suffix component. The set of values is divided into at least a first plurality of values and a second plurality of values. Compression of each plurality of values involves determining a prefix component that is shared by each value of the plurality of values. Compression further involves determining a plurality of suffix components belonging to the plurality of values. The prefix component is stored separately from the plurality of suffix components but contiguously with a suffix component of the plurality of suffix components. This enables the prefix component and the suffix component to be read as a value of the plurality of values.

20 Claims, 9 Drawing Sheets

(56) References Cited

U.S. PATENT DOCUMENTS

| | | | |
|---|---|---|---|
| 6,754,617 B1 * | 6/2004 | Ejerhed | G06F 40/268 704/9 |
| 7,031,994 B2 | 4/2006 | Lao et al. | |
| 7,496,589 B1 | 2/2009 | Jain et al. | |
| 8,229,917 B1 | 7/2012 | Aneas | |
| 8,356,060 B2 | 1/2013 | Marwah et al. | |
| 8,434,075 B1 | 4/2013 | Brown | |
| 8,521,788 B2 | 8/2013 | Ellison et al. | |
| 8,572,131 B2 | 10/2013 | Ellison et al. | |
| 8,645,337 B2 | 2/2014 | Kapoor et al. | |
| 8,650,182 B2 | 2/2014 | Murthy | |
| 8,832,142 B2 | 9/2014 | Marwah et al. | |
| 8,935,223 B2 | 1/2015 | Ganesh | |
| 9,262,477 B1 | 2/2016 | Gu | |
| 9,495,466 B2 | 11/2016 | Geringer et al. | |
| 9,559,720 B2 | 1/2017 | Marwah et al. | |
| 9,965,501 B2 | 5/2018 | Ellison et al. | |
| 2003/0097157 A1 | 5/2003 | Wohlgemuth | |
| 2004/0243555 A1 | 12/2004 | Bolsius et al. | |
| 2005/0013483 A1 | 1/2005 | Watson | |
| 2005/0065776 A1 * | 3/2005 | Coden | G06F 40/295 704/10 |
| 2005/0097078 A1 | 5/2005 | Lohman et al. | |
| 2005/0177557 A1 | 8/2005 | Ziauddin | |
| 2005/0267866 A1 | 12/2005 | Markl | |
| 2006/0031189 A1 | 2/2006 | Muras | |
| 2006/0074874 A1 | 4/2006 | Day et al. | |
| 2006/0136396 A1 | 6/2006 | Brobst | |
| 2008/0140347 A1 | 6/2008 | Ramsey | |
| 2009/0037402 A1 | 2/2009 | Lee et al. | |
| 2009/0037405 A1 | 2/2009 | Lee | |
| 2009/0106219 A1 | 4/2009 | Belknap | |
| 2009/0252391 A1 | 10/2009 | Matsuda | |
| 2009/0292679 A1 | 11/2009 | Ganesh | |
| 2010/0082545 A1 * | 4/2010 | Bhattacharjee | G06F 16/328 707/641 |
| 2010/0114843 A1 | 5/2010 | Farrar | |
| 2010/0161569 A1 | 6/2010 | Schreter | |
| 2010/0302272 A1 | 12/2010 | Reid | |
| 2010/0306188 A1 | 12/2010 | Cunningham et al. | |
| 2010/0318497 A1 | 12/2010 | Price | |
| 2012/0296881 A1 | 11/2012 | Christian | |
| 2012/0323929 A1 | 12/2012 | Kimura | |
| 2013/0103655 A1 | 4/2013 | Fanghaenel | |
| 2013/0262435 A1 | 10/2013 | Bossman et al. | |
| 2014/0046928 A1 | 2/2014 | Konik et al. | |
| 2014/0074805 A1 | 3/2014 | Kapoor et al. | |
| 2014/0297651 A1 | 10/2014 | Shadmon | |
| 2015/0032763 A1 | 1/2015 | Marwah et al. | |
| 2016/0171053 A1 * | 6/2016 | Shergill | G06F 16/2246 707/693 |

OTHER PUBLICATIONS

Shergill, U.S. Appl. No. 14/572,765, filed Dec. 16, 2014, Notice of Allowance, dated Feb. 28, 2019.

Shergill Jr, U.S. Appl. No. 15/267,759, filed Sep. 16, 2016, Office Action, dated Nov. 1, 2019.

Kabra et al., "Efficient Mid-Query Re-Optimization of Sub-Optimal Query Execution Plans", Sigmond, dated 1998, 12 pages.

Index compression—IBM DB2 9.7 for Linux, UNIX, and Windows, "Index compression", internet https://www-01.ibm.com/support/knowledgecenter/api/content/nl/enus/SSEPGG_9.7.0, viewed on Jan. 20, 2016, 2 pgs.

Elmasri, et al., "Fundatmentals of Database Systems,"Third Edition, Addison-Wesley Longman, Inc., dated 2000, 26 pages.

Deshpande et al., "Adaptive Query Processing", Foundations and Trends in Databases, vol. 1 No. 1, dated 2007, 140 pages.

Ailamaki, Anastassia, et al, "Weaving Relations for Cache Performance," Proceedings of the 27th International Conference on Very Large Data Bases dated Sep. 11-14, 2001, 14 pages.

Lemke et al., "Speeding Up Queries in Column Stores A Case for Compression", dated Sep. 2, 2010, 14 pages.

U.S. Appl. No. 14/041,884, filed Sep. 30, 2013, Restriction Requirement, dated Aug. 18, 2015.

U.S. Appl. No. 14/041,884, filed Sep. 30, 2013, Office Action, dated Oct. 7, 2015.

U.S. Appl. No. 14/041,884, filed Sep. 30, 2013, Notice of Allowance, dated Jun. 7, 2016.

U.S. Appl. No. 14/041,884, filed Sep. 30, 2013, Final Office Action, dated Dec. 15, 2015.

Shergill, U.S. Appl. No. 14/572,765, filed Dec. 16, 2014, Office Action, dated Mar. 9, 2017.

Shergill, U.S. Appl. No. 14/572,765, filed Dec. 16, 2014, Final Office Action, dated Jul. 7, 2017.

Chakkappen, U.S. Appl. No. 15/295,539, filed Oct. 17, 2016, Office Action, dated Jul. 29, 2019.

Chakkappen, U.S. Appl. No. 15/295,539, filed Oct. 17, 2016, Final Office Action, dated Jan. 24, 2020.

Shergill Jr, U.S. Appl. No. 15/267,759, Filed Sep. 16, 2016, Final Office Action dated Apr. 30, 2020.

* cited by examiner

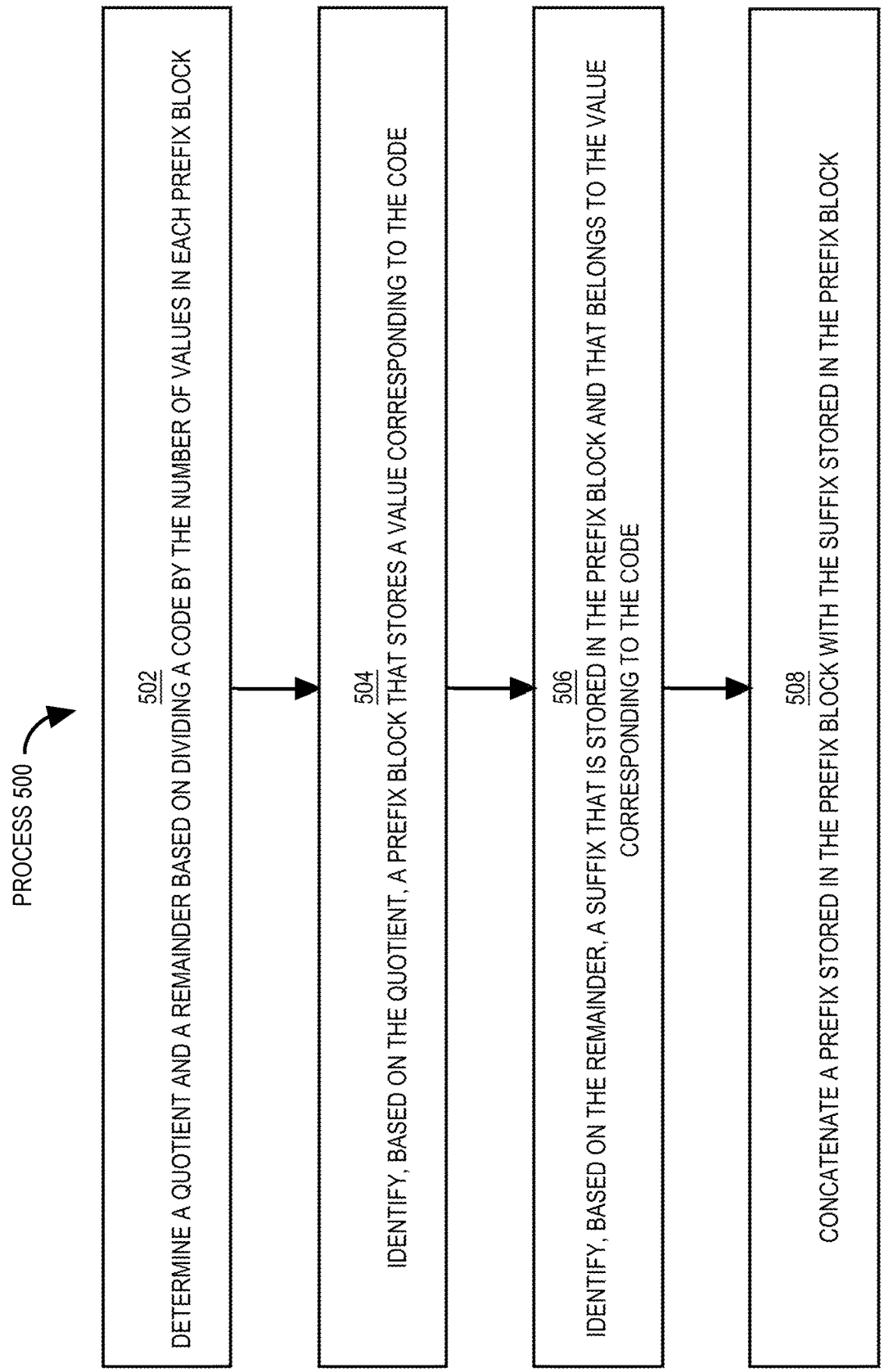

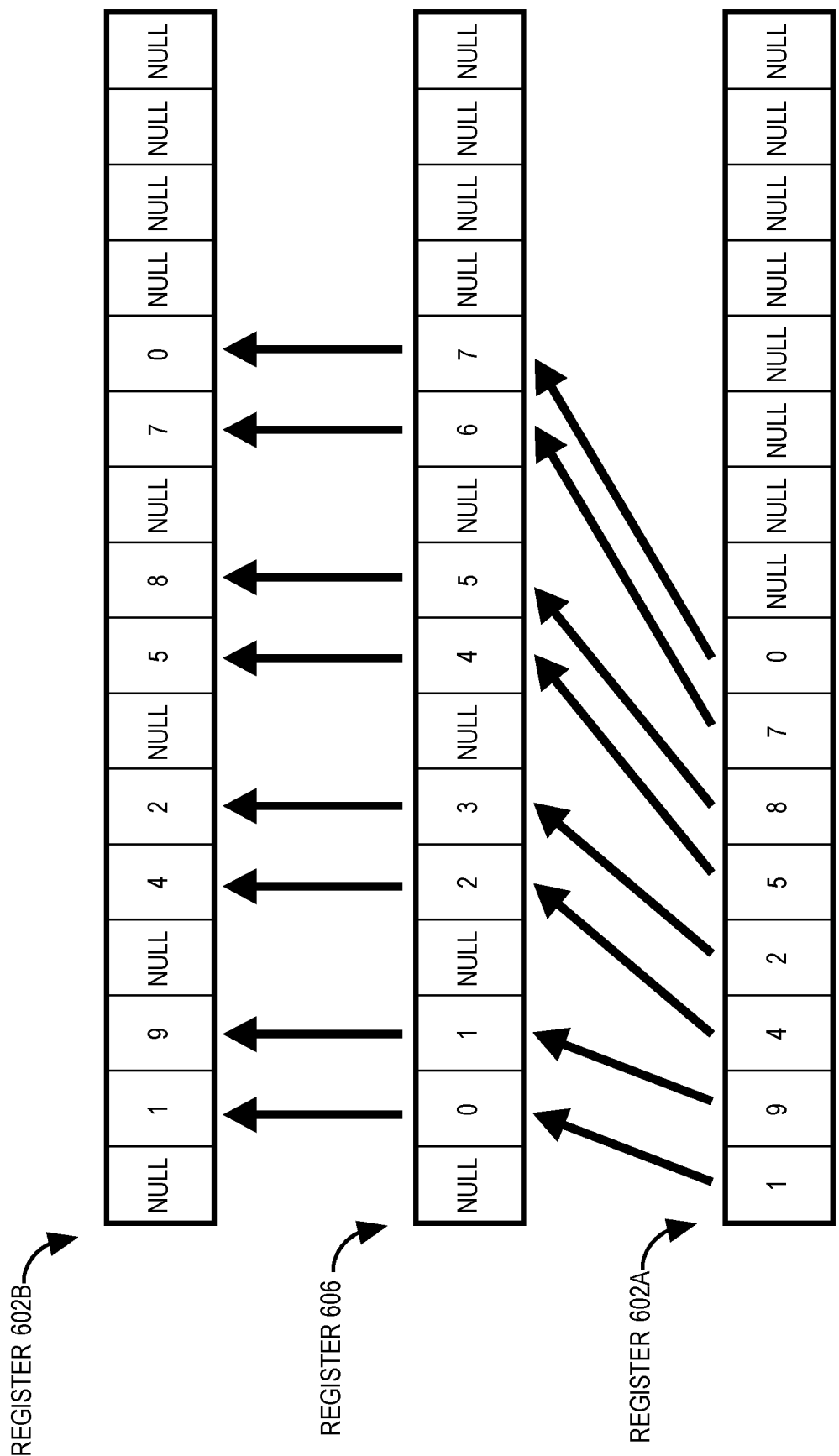

PREFIX COMPRESSION

CROSS-REFERENCE TO RELATED APPLICATIONS; BENEFIT CLAIM

This application claims the benefit of Provisional Application 62/565,502, filed Sep. 29, 2017, the entire contents of which is hereby incorporated by reference as if fully set forth herein, under 35 U.S.C. § 119(e).

TECHNICAL FIELD

Embodiments are generally related to information storage and retrieval technology. More specifically, embodiments are related to prefix compression.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Columnar Database Data

To enable efficient evaluation of database queries, database tables may be stored in a column-major format. Database tables stored in this way are referred to herein as "columnar database data". In column-major format, a column for a subset of rows in a database table are stored contiguously within a memory address space. Contiguously storing column values enables faster processing of the column values, because the column values can be accessed more quickly.

Columnar database data can be stored in structures referred to herein as "column vectors". A column vector may store some or all of the values of a column.

Dictionary Encoding

Columnar database data may be stored in a compressed format to conserve space in memory. Often used is a lightweight compression technique known as "dictionary encoding", which enables data that comprises a relatively large number of bits to be represented by a relatively small number of bits. The relatively large number of bits corresponds to a value of database data and is hereinafter referred to as a "token". The relatively small number of bits corresponds to an encoded representation of the token and is hereinafter referred to as a "code". Tokens and codes exhibit a one-to-one relationship with each other.

Referring to FIG. 1, unencoded values 100 comprise columnar database data in an uncompressed format, and encoded values 102 comprise codes that compactly represent the columnar database data. Advantageously, storing encoded values 102 instead of unencoded values 100 enables a significant savings in memory utilization. As such, encoded values 102 can fit in relatively fast but small memory, such as dynamic random-access memory (DRAM), where queries can be executed against it relatively quickly.

Although FIG. 1 respectively depicts unencoded values 100 and encoded values 102 as strings and integers, it should be appreciated that the particular data types used may vary from implementation to implementation. However, to realize space savings, encoded values 102 preferably comprise fewer bits than unencoded values 100.

Among the costs of achieving the aforementioned space savings is the overhead of generating mappings that enable translation between tokens and codes. A token-to-code mapping enables encoding of database data, and a code-to-token mapping enables decoding of database data. A token-to-code mapping is hereinafter referred to as an "encoding dictionary", and a code-to-token mapping is hereinafter referred to as a "decoding dictionary". Encoding dictionaries and decoding dictionaries are often maintained in relatively fast but small memory along with the database data with which they are associated. As used herein, a dictionary is said to be "for", "associated with", or "corresponding to" database data if the dictionary is to be used for encoding and/or decoding the database data.

Referring to FIG. 1, code dictionary 104 enables translation between unencoded values 100 and encoded values 102. As used herein, a "code dictionary" refers to an encoding dictionary and/or a decoding dictionary. In the example of FIG. 1, code dictionary 104 comprises tokens 106, which are the distinct values of unencoded values 100. Each token of tokens 106 is mapped to a code based on an index position. For example, the token "BIRDBATH" is stored at index position "0", thereby mapping it to the code "0".

Some code dictionaries are "token-ordered". A token-ordered dictionary maintains tokens in a particular order, such as a lexicographical order. Typically, the order of the codes mirrors the order of the respective tokens. Code dictionary 104 is an example of a token-ordered dictionary.

Advantageously, code dictionaries enable efficient query evaluation based on a technique hereinafter referred to as "dictionary evaluation". In dictionary evaluation, queries can be evaluated against code dictionaries instead of encoded values, thereby making it unnecessary to decode the encoded values. For example, evaluating the query predicate "WHERE unencoded_value_100='BIRDBATH'" against code dictionary 104 results in a match at index position "0", and encoded values 102 can be subsequently scanned for rows that store the code "0".

However, a code dictionary often occupies more memory than the encoded values that are associated with the code dictionary. For example, if each integer and each character in FIG. 1 occupies one byte of memory, then code dictionary 104 occupies at least ninety-three bytes of memory, whereas encoded values 102 occupies as little as sixteen bytes of memory.

Thus, to further conserve space, it is desirable to store code dictionaries in a compressed format. However, compressing a code dictionary typically entails decompressing the code dictionary when performing dictionary evaluation. This has the drawback of increasing the cost of query evaluation in terms of both time and computational expense.

BRIEF DESCRIPTION OF THE DRAWINGS

In the drawings:

FIG. 5 is a flow diagram that depicts an example approach for projecting prefix-compressed values.

FIGS. 6A-B depict an example approach for parallelization of decompression.

Figure 1:
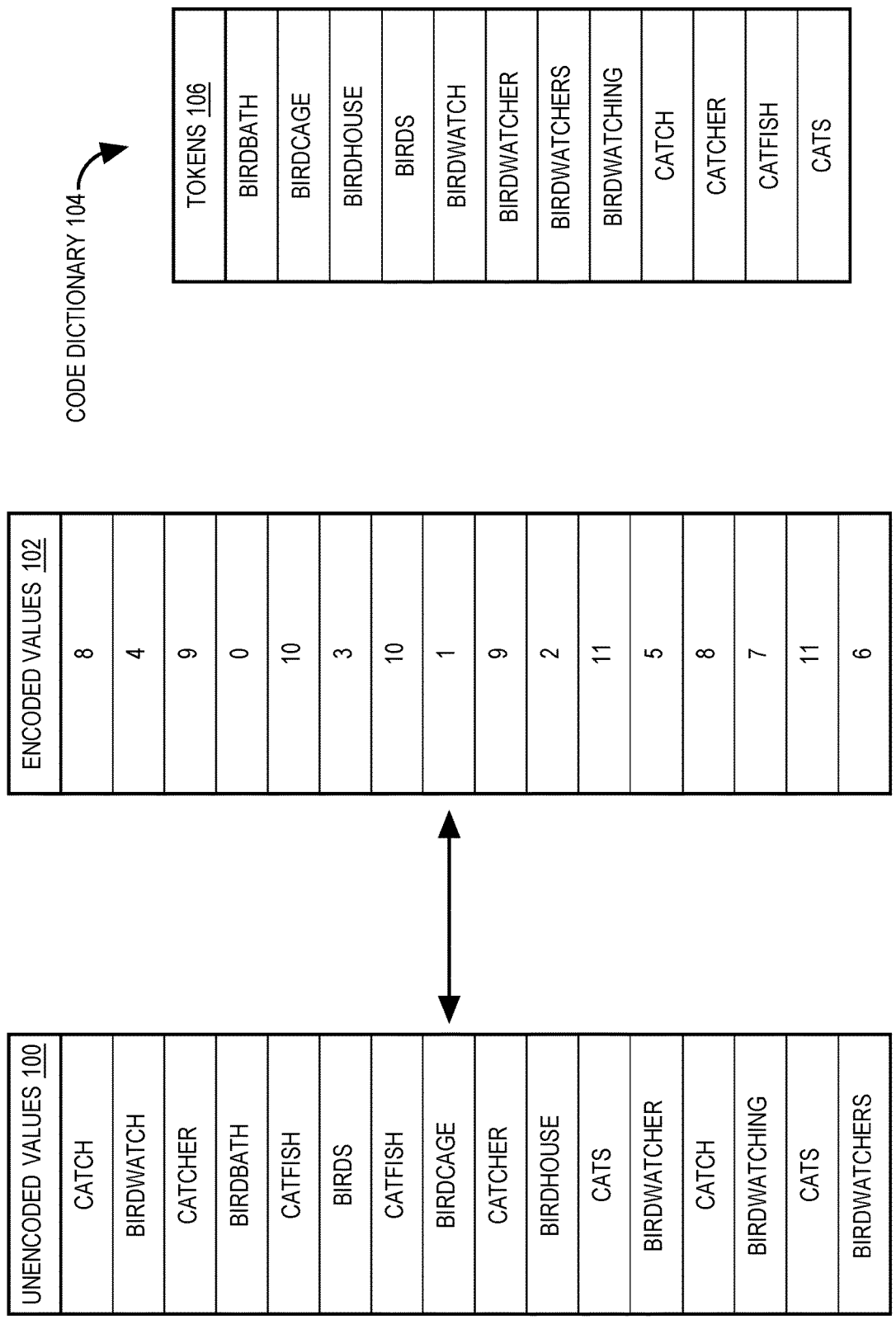
FIG. 1 depicts an example set of values to be compressed.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" are used to differentiate elements and do not necessarily indicate any particular order.

INTRODUCTION

To enable efficient query evaluation over a set of values in a compressed format, the set of values are compressed using a technique referred to herein as "prefix compression". In prefix compression, suffix components of a set of ordered values are collectively stored in a separate memory location from a prefix component that is shared by the set of ordered values. This enables space savings to be achieved by storing the prefix component only once instead of multiple times.

Performing prefix compression on a set of ordered values may also involve dividing the set of ordered values into groups hereinafter referred to as "prefix blocks". Each value in a prefix block has the same prefix component as the other values in the prefix block. This prefix component is stored separately from a set of suffix components for the other values.

Advantageously, prefix blocks enable increased compression ratios. More specifically, dividing a set of ordered values into smaller subsets of values enables prefix components to be longer. Longer prefix components enable more compact storage.

Prefix blocks also offer other benefits. As described in greater detail below, prefix blocks enable performing query evaluation with little to no decompression.

In some embodiments, each prefix block stores a prefix component contiguously with the first suffix component of a set of suffix components stored in the prefix block. This enables the prefix component and the first suffix component to be read together as if the first value in the prefix block were uncompressed. Advantageously, this enables a technique referred to herein as "selective decompression". In selective decompression, less than all prefix-compressed values are decompressed.

For example, similar to the way in which the guide words of an analog dictionary can be used to determine a range of words included in a particular dictionary page, the first values of a set of prefix blocks can be used to determine a range of values stored in a particular prefix block. In other words, since the values stored in each prefix block are ordered, the first values of adjacent prefix blocks can be used to determine a minimum value and a maximum value for at least one of the adjacent prefix blocks. This enables limiting any decompression to only one prefix block of a set of prefix blocks. Furthermore, performing a binary search through a set of suffix components within a particular prefix block enables limiting any decompression to a single prefix-compressed value.

However, even "full decompression" can be performed more efficiently based on prefix blocks. As used herein, "full decompression" refers to decompressing all prefix-compressed values. More specifically, prefix blocks enable parallelization of full decompression based on techniques such as single instruction, multiple data (SIMD) processing.

For example, each prefix block may store the same number of values, and these values may be concurrently decompressed in a SIMD register. Concurrently decompressing the values in a prefix block may involve storing the prefix component multiple times in a first register, each instance of the prefix component being sufficiently spaced apart such that a suffix component can be accommodated between each pair of instances. Concurrent decompression may also involve storing suffix components in a second register, each suffix component being sufficiently spaced apart such that an instance of a prefix component can be accommodated between each pair of suffix components. Furthermore, concurrent decompression may involve storing, in a third register, the result of performing a bitwise OR operation on the first register and the second register. Thus, the third register stores decompressed values.

Prefix Compression

As mentioned above, prefix compression enables compressing a set of values without adversely affecting query evaluation performance. Each value in the set of values can be divided into two components—a prefix component and a suffix component. A prefix component refers to one or more alphanumeric symbols at the beginning of a value, and a suffix component refers to zero or more alphanumeric symbols that are not included in the prefix component. For example, in the token "BIRDBATH", the prefix component is "BIRD", and the suffix component is "BATH".

To conserve space, values that have a prefix component in common can be stored together such that it is unnecessary to store the prefix component more than once. This can be achieved based on storing the values such that their suffix components are stored contiguously with each other but separately from the prefix component.

Figure 2:
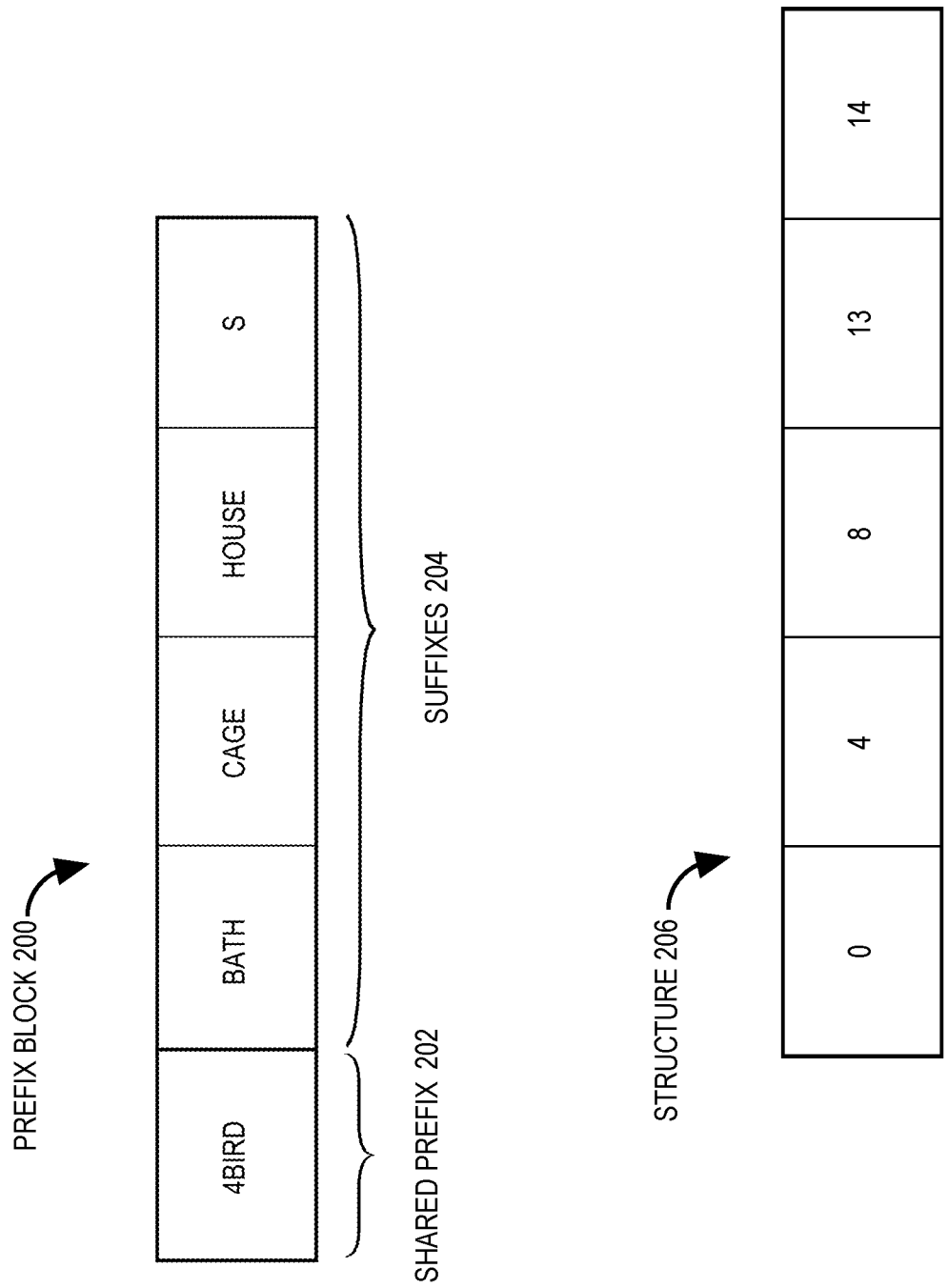
FIG. 2 depicts an example prefix block.

In the example of FIG. 2, a set of values that are to be prefix-compressed comprises tokens from code dictionary 104. It should be appreciated that prefix compression is not limited to dictionary tokens; rather, prefix compression is applicable to any ordered set of values. For example, prefix compression is applicable to a set of fixed-size data, such as a set of integer data type values that are organized in increasing order. Prefix compression is also applicable to a set of variable-size data, such as a set of dictionary tokens that are organized in a lexicographical order.

Referring to FIG. 2, prefix compression is performed on a plurality of values comprising "BIRDBATH", "BIRDCAGE", "BIRDHOUSE", and "BIRDS". This involves determining a prefix component, if any, that is shared by each value in the plurality of values. In the example of FIG. 2, there is a shared prefix component, namely "BIRD", which is labeled as "shared prefix 202". Prefix compression also involves determining a set of suffix components that belong to the plurality of values. In the example of FIG. 2, the set of suffix components comprise "BATH", "CAGE", "HOUSE", and "S". The set of suffix components are labeled as "suffixes 204". Suffixes 204 are stored separately from shared prefix 202.

Prefix Blocks

For a set of values, a shared prefix component and a set of suffix components can be stored as a logical unit referred to herein as a "prefix block". Referring to FIG. 2, prefix block 200 comprises shared prefix 202 in a first portion and suffixes 204 in a remaining portion. Thus, the shared prefix component is stored separately from the set of suffixes but contiguously with the first suffix component of the set of suffixes. In the example of FIG. 2, shared prefix 202 is stored separately from suffixes 204 but contiguously with the suffix component "BATH".

Advantageously, this enables the shared prefix component and the first suffix component to be read as the first value in the set of values. For example, storing the prefix component "BIRD" contiguously with the suffix component "BATH" enables the pair of components to be read together as the token "BIRDBATH". As will be described in greater detail below, this storage format facilitates searches for particular values.

In some embodiments, a shared prefix component is stored along with a size value that indicates the length of the shared prefix component. For example, shared prefix 202 may be preceded by a byte value for the number "4", which indicates that "BIRD" has a length of four bytes. Thus, the size value can be used to determine a boundary between a shared prefix component and a set of suffix components.

For a set of fixed-size values, a respective length of each suffix component can be deduced based on the size value. To illustrate, for a set of eight-byte numbers, if the size value of the shared prefix component is three bytes, then the length of each suffix component must be five bytes.

However, for a set of variable-size values, boundaries between suffix components may be determined based on length information and/or offset information stored for the suffix components. The length information and/or the offset information may be stored in one or more data structures, such as structure 206. Structure 206 is an example of a cumulative length array (CLA), which is described U.S. patent application Ser. No. 14/805,414, filed Jul. 21, 2015, the entirety of which is incorporated herein by reference.

Referring to FIG. 2, structure 206 stores byte offsets indicating where each suffix component begins and ends. For example, the byte offsets "0" and "4" respectively indicate where to start and stop reading the suffix component "BATH". Offset information can also be used to determine lengths of suffix components. For example, length information for the suffix component "BATH" may be determined based on subtracting the byte offset "0" from the byte offset "4".

In some embodiments, in addition to or in lieu of storing offset information in one or more data structures, length information may be stored in one or more data structures. For example, length information for suffixes 204 may be stored in the following structure:

| 4 | 4 | 5 | 1 |
|---|---|---|---|

To enable increased compression ratios, a set of values may be stored in a plurality of prefix blocks. The set of values may be divided into the plurality of prefix blocks such that each value in a prefix block shares a prefix component with other values in the prefix block. However, some values may not be stored in any prefix block, such as when a subset of values does not have a prefix component in common.

Figure 3:
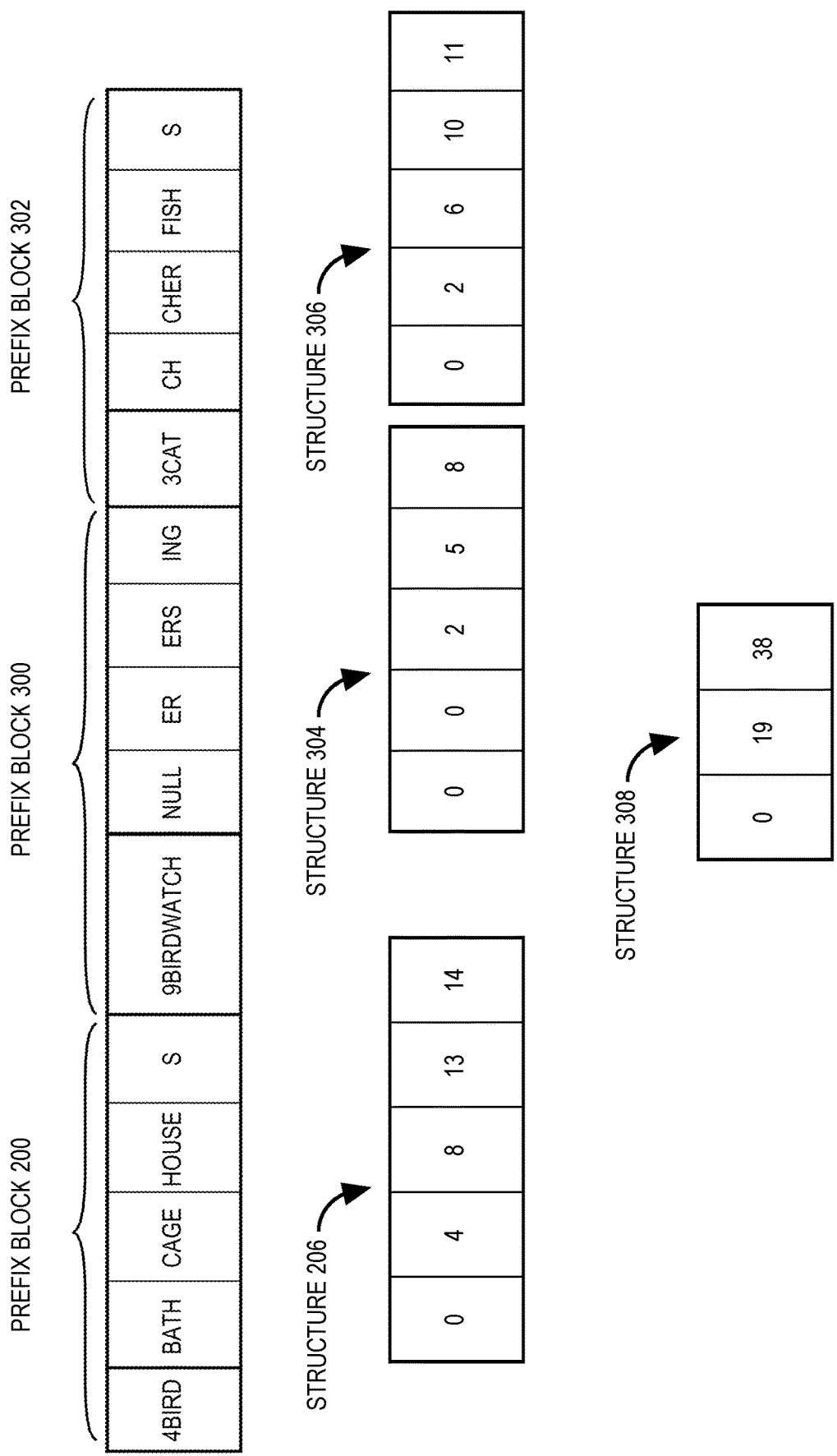
FIG. 3 depicts the example set of values as a plurality of prefix blocks.

Referring to FIG. 3, tokens 106 are stored in a plurality of prefix blocks comprising prefix block 200, prefix block 300, and prefix block 302. Advantageously, using a plurality of prefix blocks to store a set of values enables longer prefix components, and longer prefix components enable more compact storage. For example, if the first eight tokens of code dictionary 104 were to be stored in a single prefix block, then the prefix component would only be "BIRD". Multiplying the four bytes of "BIRD" with the seven times it does not have to be stored results in a savings of twenty-eight bytes. In contrast, storing the first eight tokens of code dictionary 104 as depicted in prefix blocks 200 and 300 results in a savings of thirty-nine bytes, because prefix block 300 can have a much longer prefix component—"BIRDWATCH".

As mentioned above, for a set of variable-size values, boundaries between suffix components may be determined based on length information and/or offset information stored for the suffix components. The length information and/or the offset information may be stored in one or more data structures for each prefix block. In the example of FIG. 3, structures 206, 304, and 306 store offset information for prefix blocks 200, 300, and 302, respectively. Like structure 206, structures 304-306 are examples of CLAs. Structures that store length information and/or offset information for suffix components are hereinafter referred to as "suffix structures".

In some embodiments, one or more additional data structures may be used to store offset information for prefix components in the plurality of prefix blocks. Referring to FIG. 3, structure 308 stores byte offsets indicating where each prefix component begins. Like structures 206, 304, and 306, structure 308 is an example of a CLA. A structure that stores offset information for prefix components is hereinafter referred to as a "prefix structure".

Selective Decompression

As mentioned above, prefix blocks enable selective decompression. Selective decompression may be used to evaluate queries against a set of prefix-compressed values such that little, if any, decompression is necessary. Selective decompression may be performed in various ways. For example, depending on whether a query involves a scan operation or a projection operation, selective decompression may be performed differently. Additionally or alternatively, variations exist for prefix-compressed values having a fixed size or a variable size.

Figure 4:
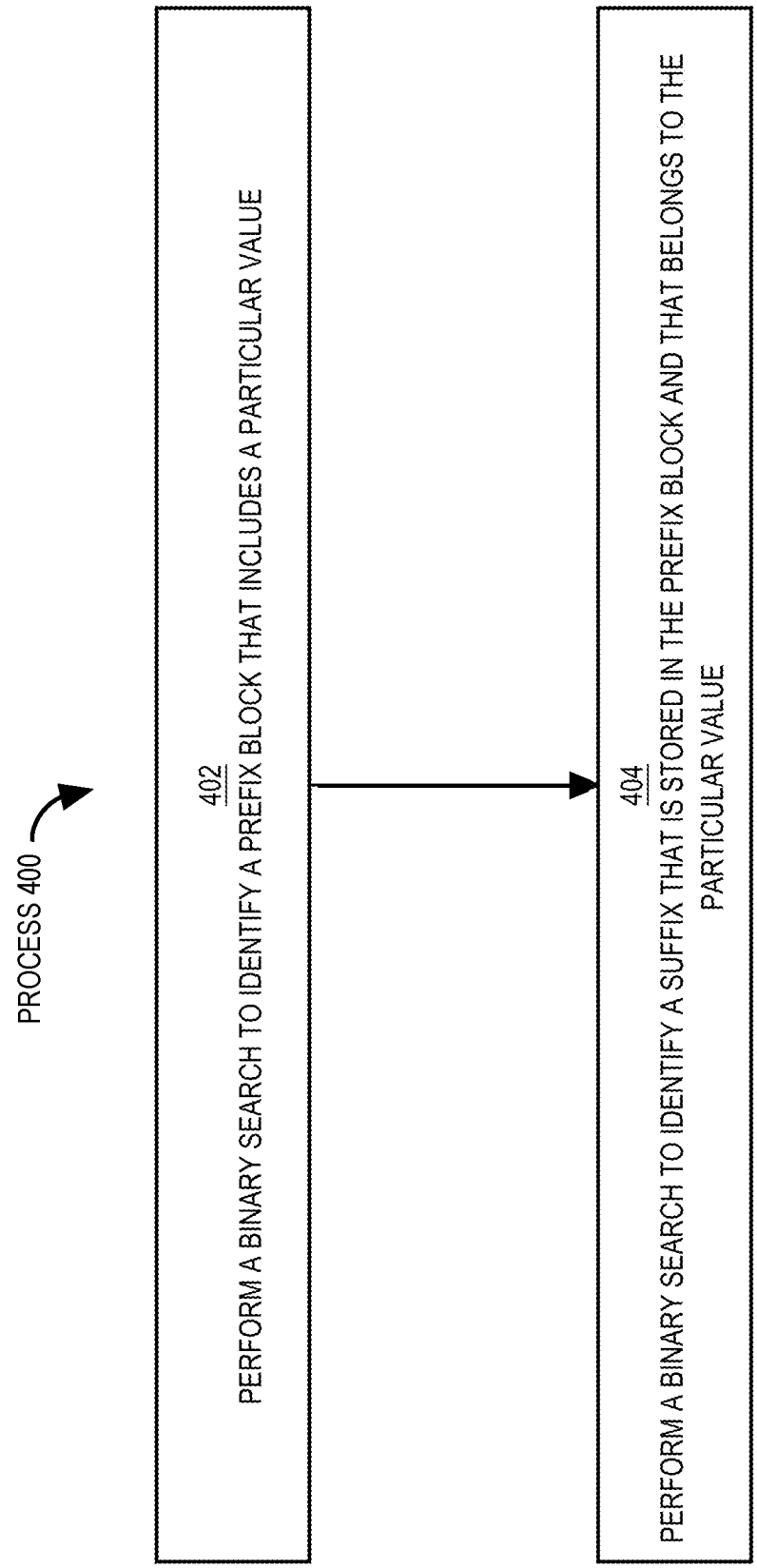
FIG. 4 is a flow diagram that depicts an example approach for scanning prefix-compressed values.

FIG. 4 illustrates an example process that enables selective decompression. Referring to FIG. 4, process 400 is performed to evaluate a query based on scanning a set of prefix-compressed values for a particular value. For example, the query may include the predicate "WHERE unencoded_value_100='BIRDCAGE'".

At block 402, a binary search for the particular value is performed on a plurality of prefix blocks. This may involve comparing the particular value to the first value in one or more prefix blocks. For example, the binary search may begin at prefix block 300 based on comparing the token "BIRDCAGE" to "BIRDWATCH". Since tokens 106 have variable sizes, structure 308 may be referenced to determine offsets of prefix blocks. Upon determining that "BIRD- CAGE" is lexicographically less than "BIRDWATCH", the binary search may proceed to prefix block 200, where "BIRDCAGE" is compared to "BIRDBATH". Since "BIRDCAGE" is lexicographically greater than "BIRD-BATH", it can be assumed that prefix block 200 includes the token "BIRDCAGE".

At block 404, another binary search is performed on a plurality of suffix components stored in the prefix block identified at block 402. This binary search is for a suffix component of the particular value. For example, since prefix block 200 stores the prefix component "BIRD", this prefix component can be stripped from the token "BIRDCAGE" to derive the suffix component "CAGE". Since tokens 106 have variable sizes, prefix block 200 may be referenced to determine offsets of suffix components. The binary search may begin with a comparison of "CAGE" to "HOUSE". Since "CAGE" is lexicographically less than "HOUSE", the binary search may proceed to "CAGE", which is a match.

In some embodiments, it is unnecessary to decompress any prefix-compressed values. For example, if the particular value had been the token "BIRDBATH", decompression would have been unnecessary, because the prefix component "BIRD" and the suffix component "BATH" are already stored contiguously such that they can be read as a single value.

Embodiments related to dictionary evaluation provide further examples in which it is unnecessary to decompress any prefix-compressed values. As mentioned above, dictionary evaluation involves evaluating at least part of a query over encoded values based on first evaluating at least part of the query against a code dictionary for the encoded values. This may involve obtaining dictionary codes that correspond to dictionary tokens satisfying at least part of the query.

Obtaining corresponding dictionary codes can be achieved based on determining index positions for suffix components located at block 404. This may involve referencing structure 206. For example, since "CAGE" is the second suffix component in the first prefix block, it can be determined that the token "BIRDCAGE" corresponds to the code "1", which is the second code in a zero-indexed set of codes.

Thereafter, encoded values may be scanned for the corresponding codes. For example, a query predicate can be determined to be satisfied in the eighth row, where the code "1" is stored. Significantly, decompression of any prefix-compressed values can be avoided, thereby realizing space savings without adversely affecting query evaluation performance.

In some embodiments, however, it may be desirable to decompress one or more prefix-compressed values. For example, the token "BIRDCAGE" may be decompressed based on stitching together the prefix component "BIRD" and the suffix component "CAGE". Nevertheless, in such embodiments, decompression can be limited to a particular value, thereby realizing space savings without significantly affecting query evaluation performance.

Embodiments related to projection operations provide further examples in which it may be desirable to decompress one or more prefix-compressed values. For example, a query may include a predicate that is satisfied by one or more rows of an encoded column vector, and the query may specify projecting the values that correspond to the codes in the one or more rows. Instead of decompressing all of the prefix-compressed values or even an entire prefix block, process 500 of FIG. 5 may be performed to limit decompression to values that satisfy the predicate.

In some embodiments, each prefix block stores an identical number of values. For reasons that are provided in the following section, this number may correspond to a number of values that can fit in a single SIMD register. For example, each prefix block may store four tokens.

At block 502, a quotient and a remainder are determined based on performing a division operation and/or a modulo operation on a code that satisfies a query predicate. The divisor is the fixed number of values stored in each prefix block. For example, if the code is "9" and the per-block number of values is "4", then the quotient is "2" and the remainder is "1".

At block 504, the quotient is used to identify a prefix block storing a value that corresponds to the code. For example, a quotient of "2" may indicate that the second prefix block in a plurality of prefix blocks stores a token corresponding to the code "9".

At block 506, the remainder is used to identify a suffix component in the prefix block identified at block 504. The suffix component belongs to the value that corresponds to the code. For example, a remainder of "1" may indicate that the second suffix component of the second prefix block belongs to the token corresponding to the code "9".

At block 508, selective decompression is performed. This may involve stitching together the prefix component stored in the prefix block identified at block 504 and the suffix component identified at block 506. The resulting token may then be projected back for further processing or presentation to a user.

Full Decompression

However, full decompression may be unavoidable for some queries. For example, some queries may include a request for all the distinct values in a column vector. For such queries, the storage format of prefix blocks enable efficiently performing full decompression. More specifically, storing an identical number of values in each prefix block enables decompressing each prefix block using SIMD processing.

Figure 6A:
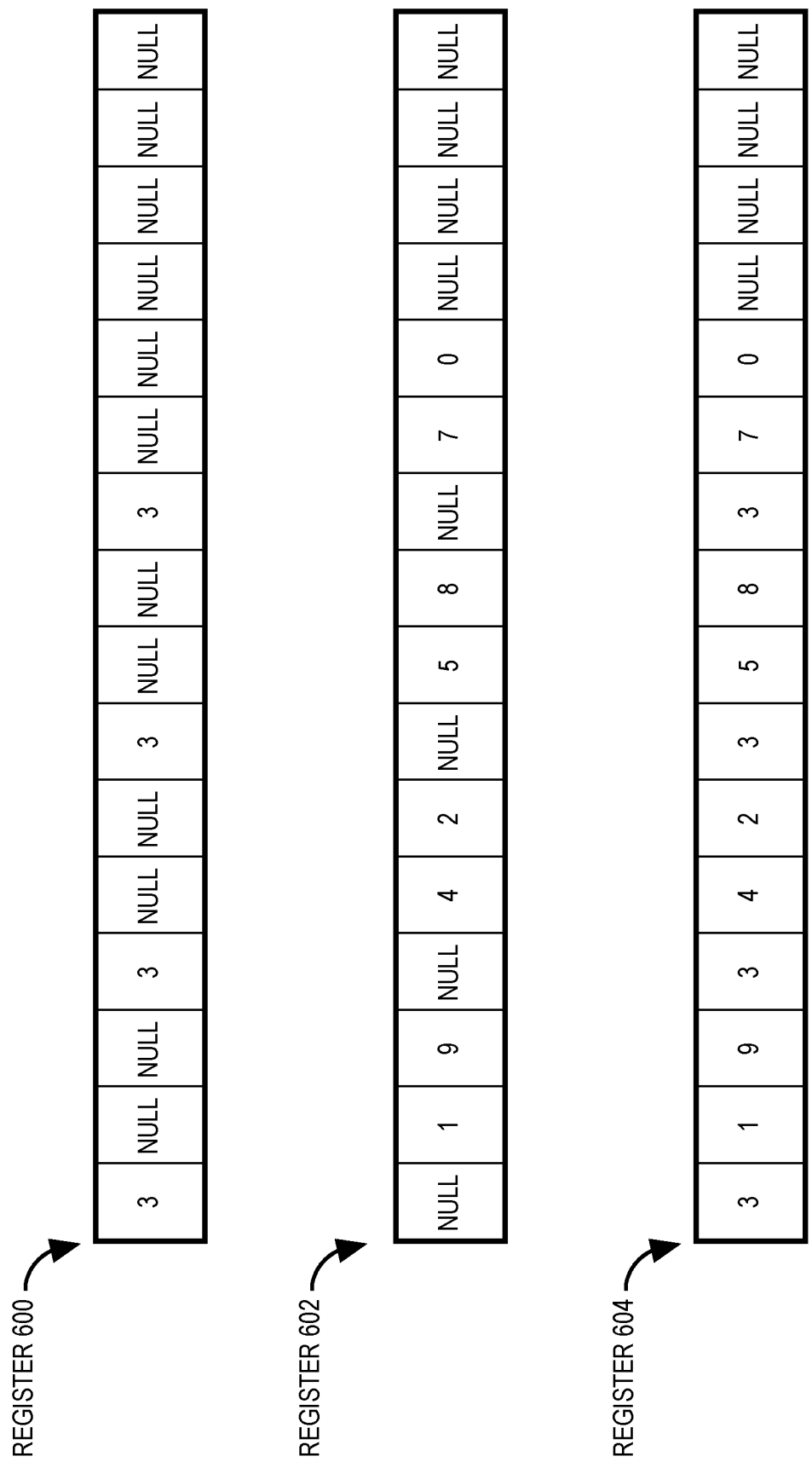

FIG. 6A depicts an example approach for full decompression involving SIMD processing. Assume that a particular prefix block stores the three-byte numeric values "319", "342", "358", and "370" compressed as "319425870". Also assume that each of registers 600-606 can store sixteen bytes of data. Thus, the three-byte values can be concurrently decompressed using sixteen-byte registers.

The prefix component "3" is loaded into register 600. A bit mask (not shown) is used to shuffle the prefix component such that four instances of the prefix component are stored as depicted in FIG. 6A.

The suffix components "19", "42", "58", and "70" are loaded into register 602. The suffix components are similarly shuffled such that they are stored as depicted in FIG. 6A.

A bitwise OR operation is performed on registers 600-602, and the result is stored in register 604. In some embodiments, the result is stored in memory.

FIG. 6B depicts an example approach for shuffling suffix components. Register 602A stores the unshuffled suffix components. Register 606 stores a bit mask that specifies how to shuffle the suffix components of register 602A. For the sake of clarity, the bit mask is depicted using decimal digits instead of bits. Each decimal digit specifies an offset from which to copy a respective byte of a suffix component. The relative position, in register 606, of each decimal digit specifies a relative position, in register 602B, to which a respective byte of a suffix component is to be shuffled.

For fixed-size values, there are a relatively limited number of possible bit masks. In some embodiments, the same bit mask can be used for shuffling suffix components of each prefix block.

However, for variable-size values, there are a relatively large number of possible bit masks. This is because each value can have a different suffix length, thereby making it difficult to predict where, in a register, to shuffle any given suffix. Thus, a pre-computed lookup table may be generated to store all possible bit masks. The table may be indexed according to the different combinations of prefix and suffix lengths that are possible for a register. Looking up a particular combination of lengths in the lookup table yields a corresponding bit mask for the particular combination.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
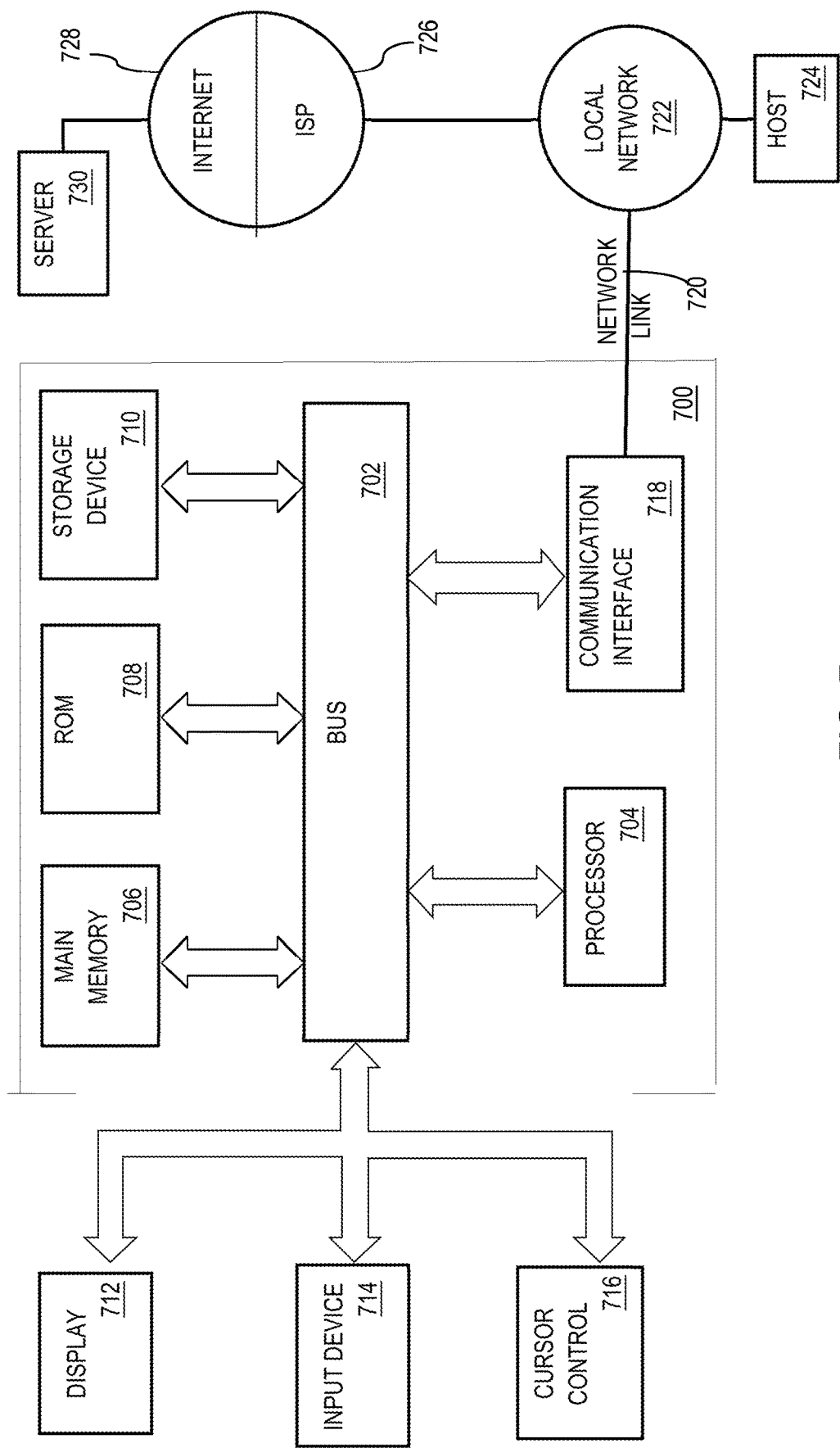
FIG. 7 depicts a computer system upon which embodiments may be implemented.

For example, FIG. 7 is a block diagram that illustrates a computer system 700 upon which an embodiment of the disclosure may be implemented. Computer system 700 includes a bus 702 or other communication mechanism for communicating information, and a hardware processor 704 coupled with bus 702 for processing information. Hardware processor 704 may be, for example, a general purpose microprocessor.

An example of a microprocessor is a single instruction, multiple data (SIMD) processor. SIMD processors perform the same operation on multiple data items simultaneously. SIMD processors exploit data level parallelism by executing a single instruction against data in multiple registers or sub-registers. Thus, the throughput per instruction may be increased accordingly.

In some embodiments, co-processers may reside on the same chip as hardware processors or processor cores. An example of a co-processor is a data analytics accelerator (DAX) co-processor. A DAX co-processor enables database operations to run directly in the co-processor while hardware processor cores execute other instructions. Such operations include (1) scanning an array for elements which match (or greater than or less than) an input value and returning a bit vector with bits set for matches; (2) selecting elements from an array based on a bit vector; and (3) in set operation, given an input set of integers, determining how many of them are also present in another set.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
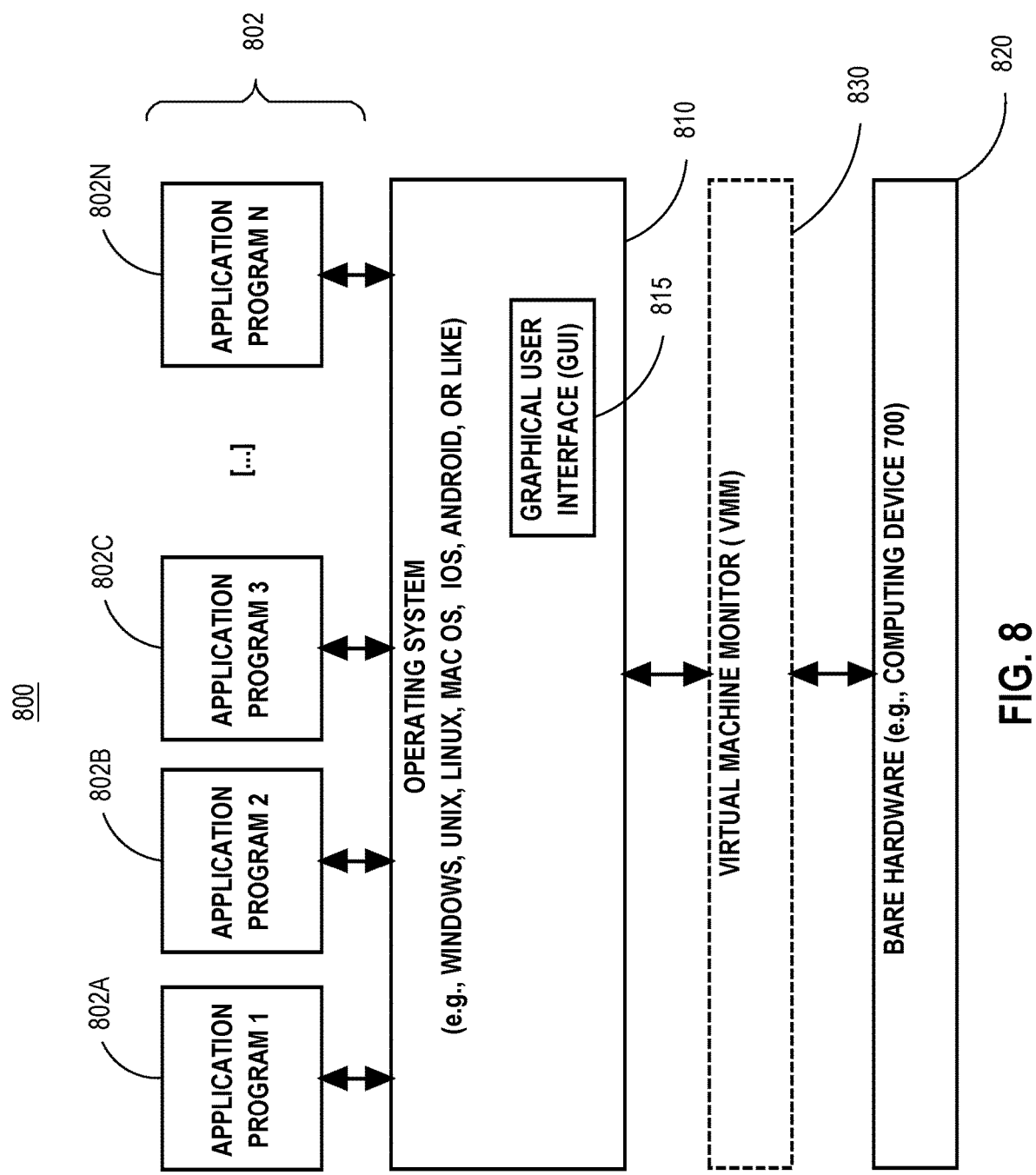
FIG. 8 depicts a software system for controlling the operation of the computer system.

FIG. 8 is a block diagram of a software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 700. The applications or other software intended for use on system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of system 800. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

EXTENSIONS AND ALTERNATIVES

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
for a set of values, each value of said set of values having a prefix component and a suffix component:
dividing said set of values into at least a first plurality of values and a second plurality of values;
for said first plurality of values:
determining a first prefix component that is shared by each value of said first plurality of values;
determining a first plurality of suffix components belonging to said first plurality of values;
within a first prefix block storing said first prefix component separately from said first plurality of suffix components but contiguously with a first suffix component of said first plurality of suffix components such that said first prefix component and said first suffix component are readable as a first value of said first plurality of values, wherein said first plurality of suffix components are stored contiguously after said first prefix component within said first prefix block;
for said second plurality of values:
determining a second prefix component that is shared by each value of said second plurality of values;
determining a second plurality of suffix components belonging to said second plurality of values;
within a second prefix block, storing said second prefix component separately from said second plurality of suffix components but contiguously with a second suffix component of said second plurality of suffix components such that said second prefix component and said second suffix component are readable as a second value of said second plurality of values, wherein said second plurality of suffix components are stored contiguously after said second prefix component within said second prefix block;
wherein the method is performed by one or more computing devices.

2. The method of claim 1, wherein said set of values are tokens of a code dictionary.

3. The method of claim 1, further comprising:
determining that a particular value of said set of values is included in said first plurality of values based on performing a first binary search that involves comparing said particular value to said first value of said first plurality of values.

4. The method of claim 3, further comprising:
locating, within said first plurality of values, a suffix component of said particular value based on performing a second binary search over said first plurality of suffix components.

5. The method of claim 4, further comprising:
determining a code that corresponds to said particular value based on determining an index position of said suffix component of said particular value;
based on said code, determining which encoded values of a set of encoded values correspond to said particular value.

6. The method of claim 1, wherein said first plurality of values and said second plurality of values have an identical number of values.

7. The method of claim 6, further comprising:
determining that an encoded value corresponds to a particular value of said set of values based on:
determining a quotient and a remainder based on dividing said encoded value by said identical number of values;
based on said quotient, determining that said particular value is included in said first plurality of values;
based on said remainder, locating within said first plurality of values, a suffix component of said particular value.

8. The method of claim 1, wherein a first structure stores byte offsets for said first prefix component and said second prefix component, and wherein a second structure stores byte offsets for one or more suffix components within a particular plurality of values.

9. The method of claim 1, further comprising:
concurrently concatenating said first prefix component with each suffix component of said first plurality of suffix components based on single instruction, multiple data (SIMD) processing.

10. The method of claim 9, wherein at least two suffix components of said first plurality of suffix components have different lengths.

11. One or more non-transitory storage media storing a sequence of instructions which, when executed by one or more computing devices, cause:
for a set of values, each value of said set of values having a prefix component and a suffix component:
dividing said set of values into at least a first plurality of values and a second plurality of values;
for said first plurality of values:
determining a first prefix component that is shared by each value of said first plurality of values;
determining a first plurality of suffix components belonging to said first plurality of values;
within a first prefix block, storing said first prefix component separately from said first plurality of suffix components but contiguously with a first suffix component of said first plurality of suffix components such that said first prefix component and said first suffix component are readable as a first value of said first plurality of values, wherein said first plurality of suffix components are stored contiguously after said first prefix component within said first prefix block;
for said second plurality of values:
determining a second prefix component that is shared by each value of said second plurality of values;
determining a second plurality of suffix components belonging to said second plurality of values;
within a second prefix block, storing said second prefix component separately from said second plurality of suffix components but contiguously with a second suffix component of said second plurality of suffix components such that said second prefix component and said second suffix component are readable as a second value of said second plurality of values, wherein said second plurality of suffix components are stored contiguously after said second prefix component within said second prefix block.

12. The one or more non-transitory storage media of claim 11, wherein said set of values are tokens of a code dictionary.

13. The one or more non-transitory storage media of claim 11, wherein said sequence of instructions further comprise instructions which, when executed by said one or more computing devices, cause:
determining that a particular value of said set of values is included in said first plurality of values based on performing a first binary search that involves comparing said particular value to said first value of said first plurality of values.

14. The one or more non-transitory storage media of claim 13, wherein said sequence of instructions further comprise instructions which, when executed by said one or more computing devices, cause:
locating, within said first plurality of values, a suffix component of said particular value based on performing a second binary search over said first plurality of suffix components.

15. The one or more non-transitory storage media of claim 14, wherein said sequence of instructions further comprise instructions which, when executed by said one or more computing devices, cause:
determining a code that corresponds to said particular value based on determining an index position of said suffix component of said particular value;
based on said code, determining which encoded values of a set of encoded values correspond to said particular value.

16. The one or more non-transitory storage media of claim 11, wherein said first plurality of values and said second plurality of values have an identical number of values.

17. The one or more non-transitory storage media of claim 16, wherein said sequence of instructions further comprise instructions which, when executed by said one or more computing devices, cause:
determining that an encoded value corresponds to a particular value of said set of values based on:
determining a quotient and a remainder based on dividing said encoded value by said identical number of values;
based on said quotient, determining that said particular value is included in said first plurality of values;
based on said remainder, locating within said first plurality of values, a suffix component of said particular value.

18. The one or more non-transitory storage media of claim 11, wherein a first structure stores byte offsets for said first prefix component and said second prefix component, and wherein a second structure stores byte offsets for one or more suffix components within a particular plurality of values.

19. The one or more non-transitory storage media of claim 11, wherein said sequence of instructions further comprise instructions which, when executed by said one or more computing devices, cause:
concurrently concatenating said first prefix component with each suffix component of said first plurality of suffix components based on single instruction, multiple data (SIMD) processing.

20. The one or more non-transitory storage media of claim 19, wherein at least two suffix components of said first plurality of suffix components have different lengths.

* * * * *

UNITED STATES PATENT AND TRADEMARK OFFICE
CERTIFICATE OF CORRECTION

PATENT NO. : 10,838,961 B2
APPLICATION NO. : 16/022377
DATED : November 17, 2020
INVENTOR(S) : Chavan et al.

It is certified that error appears in the above-identified patent and that said Letters Patent is hereby corrected as shown below:

On the Title Page

On page 2, Column 2, item (56) under Other Publications, Line 11, delete ""Fundatmentals" and insert -- "Fundamentals --, therefor.

In the Claims

In Column 14, Line 3, in Claim 1, delete "block" and insert -- block, --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*